United States Patent
Jenkins et al.

(10) Patent No.: US 7,566,101 B2
(45) Date of Patent: *Jul. 28, 2009

(54) VEHICLE WHEEL BALANCE WEIGHTS

(75) Inventors: Ralph L. Jenkins, Scottsville, KY (US); Ross Everhard, Bowling Green, KY (US)

(73) Assignee: Hennessy Industries, Inc., LaVergne, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/324,784

(22) Filed: Jan. 3, 2006

(65) Prior Publication Data

US 2007/0013225 A1    Jan. 18, 2007

Related U.S. Application Data

(63) Continuation-in-part of application No. 11/304,126, filed on Dec. 15, 2005, which is a continuation of application No. 10/724,000, filed on Nov. 26, 2003, which is a continuation-in-part of application No. 10/620,309, filed on Jul. 15, 2003.

(60) Provisional application No. 60/396,075, filed on Jul. 15, 2002, provisional application No. 60/411,961, filed on Sep. 19, 2002, provisional application No. 60/641,110, filed on Jan. 3, 2005.

(51) Int. Cl.
*B60B 1/00* (2006.01)
*B60B 27/00* (2006.01)

(52) U.S. Cl. .................................................. 301/5.21

(58) Field of Classification Search ................ 301/5.21; 295/6; 74/573 R
See application file for complete search history.

(56) References Cited

U.S. PATENT DOCUMENTS

| 1,889,577 | A |   | 11/1932 | Tibbetts |          |
|-----------|---|---|---------|----------|----------|
| 2,029,132 | A |   | 1/1936  | Skelton  |          |
| 2,049,703 | A |   | 8/1936  | Hume     |          |
| 2,122,065 | A |   | 6/1938  | Hume     |          |
| 2,137,415 | A |   | 11/1938 | Rubsam   |          |
| 2,221,747 | A | * | 11/1940 | Turner   | 301/5.21 |

(Continued)

FOREIGN PATENT DOCUMENTS

DE            3118222      * 11/1982     ................. 301/5.21

(Continued)

OTHER PUBLICATIONS

Brochure entitled "BADA Wheel Weight Solutions," Jun. 2002.

(Continued)

*Primary Examiner*—Jason R Bellinger
(74) *Attorney, Agent, or Firm*—Nelson Mullins Riley & Scarborough LLP

(57) ABSTRACT

A vehicle wheel weight comprises a mass portion cold-formed of nonlead material and a heat-treated spring clip. The mass portion has a front and a back, with the back adapted to be juxtaposed against a wheel rim. The mass portion further defines at least one chamfer on the back thereof. The mass portion also defines a clip securement pocket in which an attachment portion of the spring clip is inserted such that the clip is fixed to the mass portion. The clip further has an extended portion for engaging the wheel rim.

11 Claims, 4 Drawing Sheets

U.S. PATENT DOCUMENTS

| | | | |
|---|---|---|---|
| 2,336,920 | A | 12/1943 | Beaman |
| 2,640,727 | A | 6/1953 | Kennedy |
| 2,696,408 | A | 12/1954 | Merriman |
| 3,008,768 | A | 11/1961 | Kinsey et al. |
| 3,011,828 | A | 12/1961 | Karig |
| 3,495,877 | A | 2/1970 | Mörne |
| 3,688,380 | A | 9/1972 | Hofmann et al. |
| 3,786,850 | A | 1/1974 | Turoczi, Jr. |
| 4,300,803 | A | 11/1981 | Chorosevic |
| 4,379,596 | A | 4/1983 | Green et al. |
| 5,228,754 | A | 7/1993 | Rogers |
| 5,350,220 | A | 9/1994 | Atwell, Jr. |
| 5,733,016 | A | 3/1998 | Brown |
| 5,959,205 | A | 9/1999 | Yamaya et al. |
| 6,238,005 | B1 | 5/2001 | Sugayauchi et al. |
| 6,238,006 | B1 | 5/2001 | Manojlovic |
| 6,250,721 | B1 | 6/2001 | Oba et al. |
| 6,260,929 | B1 | 7/2001 | Oba et al. |
| 6,286,906 | B1 | 9/2001 | Nagashima et al. |
| 6,364,422 | B1 | 4/2002 | Sakaki et al. |
| 6,488,341 | B2 | 12/2002 | Maruyama et al. |
| 6,698,845 | B2 | 3/2004 | Corte et al. |
| 7,093,907 | B2 | 8/2006 | Jenkins et al. |
| 2003/0067208 | A1 | 4/2003 | Maruyama |
| 2003/0127906 | A1 | 7/2003 | Yamaguchi |
| 2004/0007912 | A1* | 1/2004 | Amyot et al. ............... 301/5.21 |
| 2005/0104439 | A1 | 5/2005 | Phillips |
| 2008/0042486 | A1* | 2/2008 | Malbos ....................... 301/5.21 |

FOREIGN PATENT DOCUMENTS

| | | | |
|---|---|---|---|
| DE | 3529513 | | 2/1987 |
| FR | 2878957 | * | 6/2006 ................ 301/5.21 |
| JP | 4317521 | | 7/1948 |
| JP | 5316201 | | 2/1978 |
| JP | 3272347 | | 4/1991 |
| JP | 3139401 | | 6/1991 |
| JP | 113900 | | 4/2003 |

OTHER PUBLICATIONS

International Search Report (Form PCT/ISA/210) dated Sep. 25, 2006 for corresponding PCT application serial No. PCT/US2006/00030.

English translation of First Office Action issued by Chinese Patent Office for Chinese National Phase application from PCT/US2006/00030.

* cited by examiner

VEHICLE WHEEL BALANCE WEIGHTS

CROSS-REFERENCE TO A RELATED APPLICATION

This application is a continuation-in-part of copending application Ser. No. 11/304,126, filed Dec. 15, 2005, which is a continuation of application Ser. No. 10/724,000, filed Nov. 26, 2003, which is a continuation-in-part of copending application Ser. No. 10/620,309, filed Jul. 15, 2003, which claims the benefit of provisional application Ser. No. 60/396,075, filed Jul. 15, 2002, and provisional application Ser. No. 60/411,961, filed Sep. 19, 2002. This application also claims the benefit of provisional application Ser. No. 60/641,110, filed Jan. 3, 2005, which is hereby relied upon and incorporated herein by reference.

BACKGROUND OF THE INVENTION

The present invention relates to wheel balance weights.

In order to reduce excessive vibration, vehicle wheels are often balanced by placing weights at selected locations. One type of known weight includes a mass portion which is attached to the wheel's rim using a spring clip. Due to high mass and low cost, such weights have been primarily made of lead in the past. For example, such weights have been made by casting molten lead around a heat-treated spring clip. As a result, a portion of the clip would be embedded inside the mass portion, whereas another portion would extend out from the mass for attachment to a wheel rim.

Because of various factors, it is becoming desirable to manufacture such weights of materials other than lead.

SUMMARY OF THE INVENTION

The present invention provides a variety of configurations for a vehicle wheel weight. Preferred embodiments utilize iron or low carbon steel for mass instead of lead as has generally been used in the past. The mass is attached to the wheel using a spring clip preferably made of spring steel. The spring clip includes an attachment portion secured to the mass portion by an interference fit. For example, a pocket may be formed in the mass to receive the attachment portion of the spring clip. After the attachment portion is inserted, the pocket may be closed such that the spring clip is securely retained.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
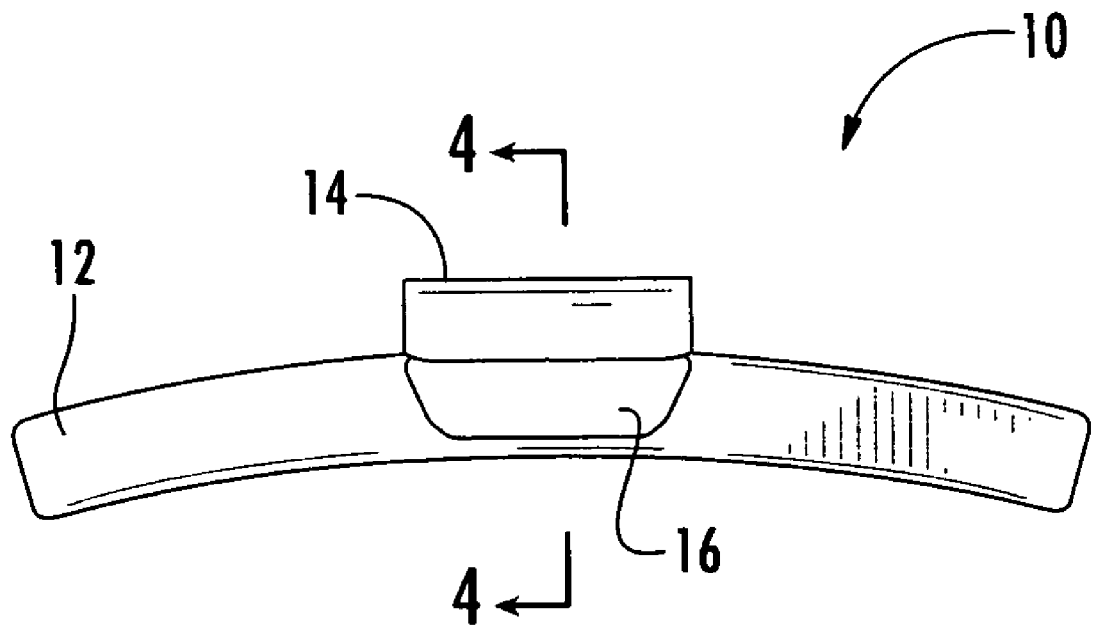
FIG. 1 is a front plan view of a vehicle wheel weight constructed in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 2:
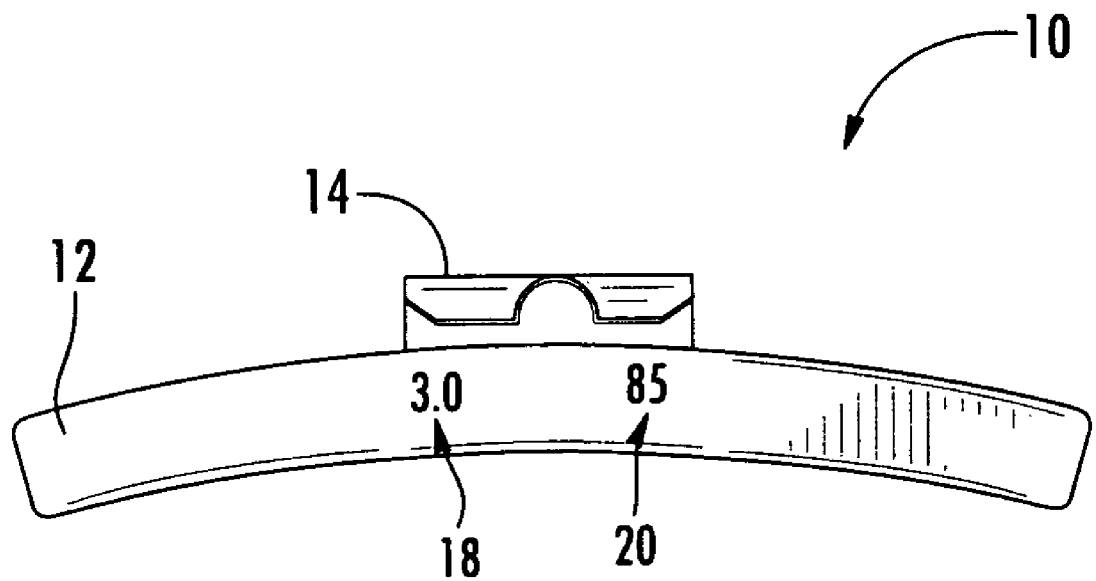
FIG. 2 is a back plan view of the wheel weight of FIG. 1.
Figure 3:
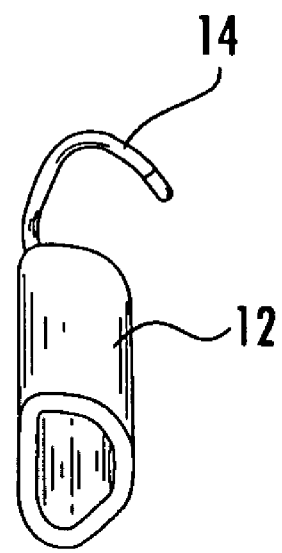
FIG. 3 is a side view of the wheel weight of FIG. 1.

FIGS. 1 through 3 illustrate a vehicle wheel weight 10 constructed in accordance with an embodiment of the present invention. As shown, wheel weight 10 includes a mass portion 12 to which a spring clip 14 is attached. As will be explained more fully below, clip 14 (which is preferably made from spring steel) is located in a cavity (or "pocket") formed in mass portion 12. This often results in a slightly raised surface 16 on the "front" of mass portion 12. (As used herein, the front of weight 10 is the side facing away from the wheel rim.) As can be seen, mass portion 12 has an arc approximating the circumference of the rim to which it will be attached.

As indicated at 18 and 20, indicia is preferably provided on mass portion 12 to indicate the weight's mass and/or type. Typically, the indicia is formed by stamping onto the mass so as to be permanent. The use of such indicia on vehicle wheel weights is common, but it has previously been provided on the front. Placing indicia on the back provides a more aesthetically pleasing product because it will be hidden during use.

Mass portion 12 is preferably made from a nonlead material having suitable mass, such as iron or low carbon steel. Often, a 1008 steel will be especially preferred. In some cases, particularly weights of higher masses, copper may also be utilized.

Figure 4:
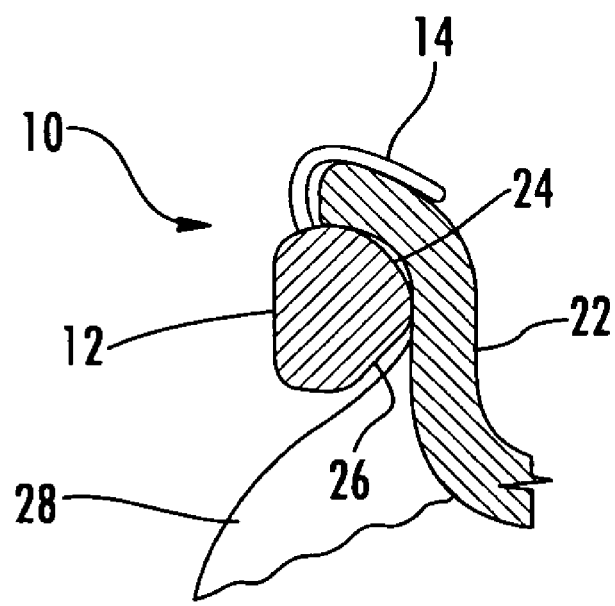
FIG. 4 is a cross-sectional view along line 4-4 of FIG. 1 showing the wheel weights mounted to a vehicle rim.

Referring now to FIG. 4, clip 14 serves to attach weight 10 to the rim 22 of a vehicle wheel. As shown, mass portion 12 is preferably configured so as to tuck neatly under the curved lip of rim 22. It can be seen that mass portion 12 has a cross-sectional profile with smooth external surfaces about its circumference. This is in contrast in many weights of the prior art which exhibited rough edges. In addition to providing a more aesthetically pleasing appearance, such a configuration tends to minimize rim damage caused by sharp surfaces.

In this case, mass portion 12 is desirably also configured to define a top chamfer 24 and a bottom chamfer 26. Chamfers 24 and 26 are formed as relatively flat sloped surfaces extending axially along the back of mass portion 12.

Chamfer 24 facilitates attaching weight 10 by minimizing the amount of stretch required in clip 14 to properly seat mass portion 12 under the rim lip. Chamfer 26 provides clearance for various features that are seen in modern rims, such as spoke 28.

Figure 5A:
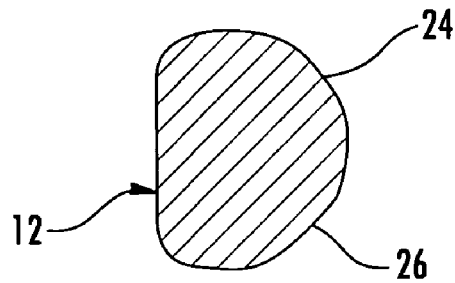
FIGS. 5A-5C are cross-sectional views of a mass portion in accordance with the present invention showing insertion of the spring clip in a cold-formed pocket.
Figure 5B:
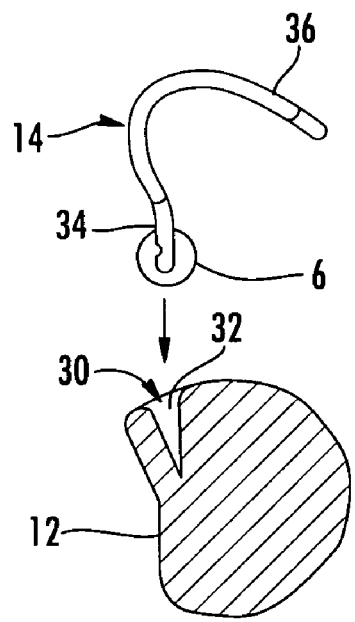
Figure 5C:
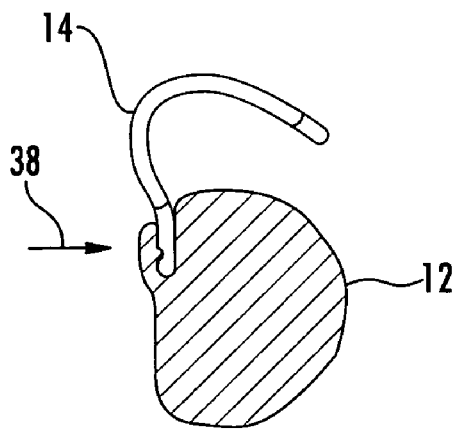

FIGS. 5A-5C illustrate one manner in which clip 14 may be attached in accordance with the present invention. In this regard, FIG. 5A shows a cross-sectional view of mass portion 12 before installation of clip 14. Mass portion 14 is preferably made from a "wire" that has been preformed with the desired cross-sectional profile. For example, chamfers 24 and 26 could be defined in the wire at the time of manufacture. A predetermined length of wire is then cut and formed with the desired arc to yield mass portion 12.

Referring now to FIG. 5B, it can be seen that a pocket 30 has been formed in mass portion 12. Pocket 30 is preferably cold-formed by inserting a lance having the appropriate configuration into the top of mass portion 12. Pocket 30 is preferably formed to be closed at both ends, such as by web 32 (and a similar web at the other end). A mechanically applied zinc (or other suitable coating or treatment) can be applied after the lancing step to form a protective coating on mass portion 12.

After pocket 30 has been formed, the attachment portion 34 of clip 14 is inserted therein. Extended portion 36 of clip 14 remains outside of mass portion 12 for engaging the rim.

Referring now to FIG. 5C, pocket 30 is forced closed (as indicated by arrow 38) after insertion of attachment portion 34. As a result, clip 14 will be strongly secured to mass portion 12.

Figure 6:
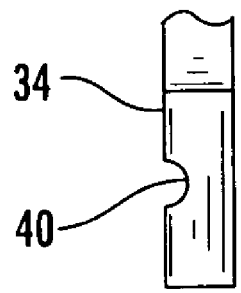
FIG. 6 is an enlarged view of the portion so indicated in FIG. 5B showing an elongate groove formed in the attachment portion of the spring clip.

Referring now to FIG. 6, it will often be desirable to provide attachment portion 34 of clip 14 with features that enhance the engagement between mass portion 12 and clip 14. In this regard, FIG. 6 illustrates an embodiment wherein an axial groove 40 is defined across the front surface of attachment portion 34. When pocket 30 is closed, metal of the mass portion will flow into groove 40 to form an interference fit.

Figure 7:
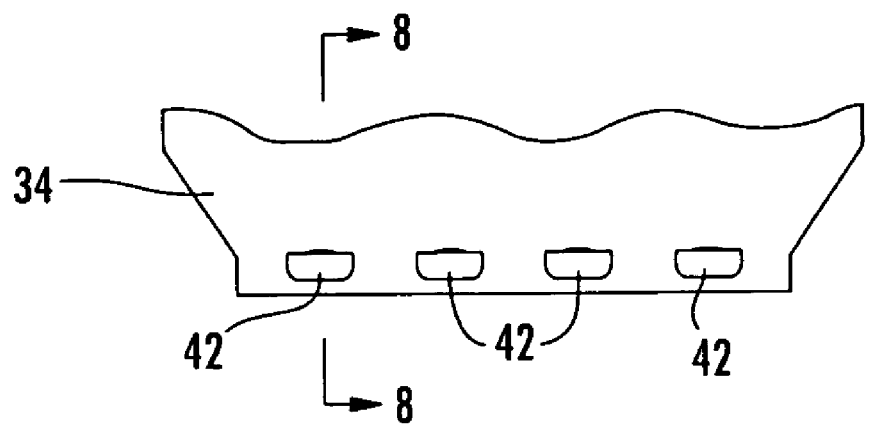
FIG. 7 is a fragmentary view showing the attachment portion of an alternative spring clip having a series of spaced apart louvers formed therein.
Figure 8:
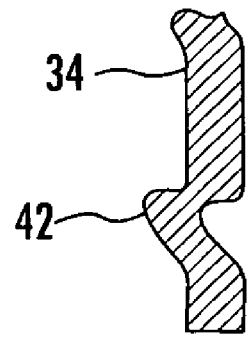
FIG. 8 is a cross-sectional view taken along line 8-8 of FIG. 7.

FIGS. 7 and 8 illustrate an alternative embodiment, where a plurality of spaced apart louvers 42 are punched into attachment portion 34 of clip 14. Louvers 42 also serve to provide secure engagement between mass portion 12 and clip 14 in a manner similar to groove 40.

Applicant hereby refers to related application Ser. No. 10/724,000, filed Nov. 26, 2003 and Ser. No. 10/620,309, filed Jul. 15, 2003, both of which are commonly assigned. Each of these copending applications is incorporated fully herein by reference.

The use of a cold-formed pocket for attaching clip 14 to mass portion 12 is desirable for a number of reasons. For example, casting a steel mass in a manner similar to that of lead weights would cause loss of the heat treatment on the clip. In addition, such a technique would not generally be economical.

While an embodiment utilizing a single clip is shown, one skilled in the art will appreciate that larger mass portions may require more than one clip spaced apart along its axial length.

While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention defined in the appended claims.

What is claimed is:

1. A method of forming a vehicle wheel weight having a mass portion and a spring clip, said method comprising steps of:
   (a) providing a mass portion having an arcuate shape along a longitudinal axis thereof;
   (b) cold-forming a clip securement pocket in said mass portion, said clip securement pocket being defined by first and second seamless webs respectively located at each of two ends of said securement pocket such that said ends are closed, said clip securement pocket further including an insertion opening;
   (c) inserting an attachment portion of said spring clip into said insertion opening of said clip securement pocket, said spring clip further having an extended portion for engaging a wheel rim; and
   (d) closing said clip securement pocket against said attachment portion so as to attach said mass portion to said spring clip.

2. A method as set forth in claim 1, wherein said nonlead material is low carbon steel.

3. A method as set forth in claim 1, wherein said nonlead material is iron.

4. A method as set forth in claim 1, wherein said nonlead material is copper.

5. A method as set forth in claim 1, wherein said attachment portion of said spring clip defines at least one surface irregularity so as to facilitate retention of said attachment portion in said clip securement cavity.

6. A method as set forth in claim 5, wherein said at least one surface irregularity comprises a transverse groove defined in said attachment portion of said spring clip.

7. A method as set forth in claim 5, wherein said at least one surface irregularity comprises a plurality of spaced apart louvers defined in said attachment portion of said spring clip.

8. A method as set forth in claim 1, wherein said mass portion further defines at least one chamfer on a back thereof.

9. A method as set forth in claim 8, wherein said at least one chamfer comprises a top chamfer formed as a sloped surface extending axially along said mass portion.

10. A method as set forth in claim 8, wherein said mass portion includes indicia located on said back thereof.

11. A method as set forth in claim 10, wherein said indicia indicates mass.

* * * * *